United States Patent [19]

Kagoshima et al.

[11] Patent Number: 5,684,492

[45] Date of Patent: Nov. 4, 1997

[54] ANTENNA DEVICE HAVING A BAND PASS FILTER

[75] Inventors: Kenichi Kagoshima, Kanagawa; Koichi Tsunekawa, Yokosuka; Moriyasu Miyazaki, Kamakura; Hideki Asao, Kamakura; Osami Ishida, Kamakura; Makoto Matsunaga, Kamakura; Takashi Katagi, Kamakura, all of Japan

[73] Assignees: Mitsubishi Denki Kabushiki Kaisha; Nippon Telegraph & Telephone Corporation, both of Tokyo, Japan

[21] Appl. No.: 396,657

[22] Filed: Mar. 1, 1995

Related U.S. Application Data

[63] Continuation of Ser. No. 930,544, Nov. 23, 1992, Pat. No. 5,434,579.

[30] Foreign Application Priority Data

Jan. 28, 1991 [JP] Japan ............................. 3-8362

[51] Int. Cl.[6] ............................................. H01Q 1/38
[52] U.S. Cl. ........................... 343/700 MS; 343/702; 333/204
[58] Field of Search .................. 343/700 MS, 841, 343/702, 293, 756, 909; 333/222, 227

[56] References Cited

U.S. PATENT DOCUMENTS

| | | | |
|---|---|---|---|
| 5,068,669 | 11/1991 | Koert et al. | 343/700 MS |
| 5,125,109 | 6/1992 | Geller et al. | 343/700 MS |
| 5,142,255 | 8/1992 | Chang et al. | 333/204 |
| 5,400,039 | 3/1995 | Araki et al. | 343/700 MS |
| 5,434,579 | 7/1995 | Kagoshima et al. | 343/700 MS |
| 5,455,594 | 10/1995 | Blasing et al. | 343/700 MS |

*Primary Examiner*—Donald T. Hajec
*Assistant Examiner*—Tan Ho
*Attorney, Agent, or Firm*—Wolf, Greenfield & Sacks, P.C.

[57] ABSTRACT

In order to perform feeding to an inverted F antenna having a plate conductor of an approximately rectangular shape for forming a radiation conductor and a ground conductor arranged in parallel with the plate conductor, a strip conductor plate connected to a feeder line is provided on the ground conductor via a dielectric substrate. Hence, the feeding from the feeder line to the inverted F antenna 37 is performed by an electric field coupling of the plate conductor and the strip conductor plate. The inverted F antenna and a resonator are integrated by coupling means to carry out an impedance matching, and the inverted F antenna and the resonator 62 constitute a band pass filter.

8 Claims, 6 Drawing Sheets

ANTENNA DEVICE HAVING A BAND PASS FILTER

This application is a continuation of application Ser. No. 07/930,544 filed Nov. 23, 1992, now Pat. No. 5,434,579 issued Jul. 18, 1995.

TECHNICAL FIELD

The present invention relates to an antenna device, and more particularly to a structure for feeding to an antenna device of a plate structure, mainly used in a VHF band, a UHF band and a microwave band, and an improvement of a filter used therefor.

BACKGROUND ART

FIG. 10 shows a conventional antenna device, for example, as disclosed in "Inverted F-shaped Antenna for Portable Radios", Hiroshi HARUKI et al., No. 613 of 1982 Overall Annual Conference of the Institute of Electronics and Communication Engineers of Japan.

In FIG. 10, the conventional inverted F antenna 17 includes a plate conductor 11 with an approximately rectangular shape constituting a radiative conductor, and a ground conductor 12 constituted by metallic plates of a radio frame body. The plate conductor 11 is arranged approximately in parallel with the ground conductor 12, and one end in its longitudinal direction is connected to the ground conductor 12 by a grounding conductor 13. A coaxial line 14 as a feeder line for the antenna 17 is comprised of an internal conductor 15 and an external conductor 16.

The internal conductor 15 of the coaxial line 14 is directly connected to the facing surface of the plate conductor 11 in a position close to the grounding conductor 13 by soldering or the like. The external conductor 16 of the coaxial line 14 is connected to the ground conductor 12.

Next, the operation of the conventional inverted F antenna 17 will now be described.

In the inverted F antenna 17, the plate conductor 11 and the ground conductor 12 constitute a parallel flat line, and, since one end in the longitudinal direction of the plate conductor 11 is a short-circuit end and the other end is an open end, the inverted F antenna 17 resonates with an electric wave with a particular frequency $f_o$ depending on the longitudinal length of the plate conductor 11. Hence, the inverted F antenna 17 shown in FIG. 10 acts as a resonator with one short-circuit end and the other open end and possesses a function of an antenna device. Accordingly, a radio wave with a frequency $f_o$ fed to the inverted F antenna 17 via the internal conductor 15 of the coaxial line 14 is resonated by the inverted F antenna 17 to be radiated externally. In this case, the impedance matching of the coaxial line 14 with the inverted F antenna 17 is controlled by the connection position of the internal conductor 15 with the plate conductor 11.

Conventionally, since an antenna device of this kind is constructed by directly connecting the conductor to the inverted F antenna 17, as described above, in order to connect the internal conductor 15 with the plate conductor 11, it is necessary to carry out a soldering operation on the facing surface of the plate conductor 11 to the ground conductor 12 or to provide a through-hole in the plate conductor 11 and the soldering thereon, and thus it is troublesome to manufacture it.

Further, since the impedance matching of the input impedance of the inverted F antenna 17 to the characteristic impedance of the coaxial line 14 is controlled by the connection position of the internal conductor 15 with the plate conductor 11, in order to perform the impedance matching, the connection position of the internal conductor 15 with the plate conductor 11 is unequivocally determined. Hence, the restriction arises in arranging the parts, and the wiring of the coaxial line 14 becomes difficult.

FIG. 11 shows a conventional filter antenna device, as disclosed in "RF Branching System for the Amps Mobile Telephone Equipment", L YOSHIDA et al., 29th IEEE Vehicular Technology Conference IEEE Catalog No. 79 CH 1378-9 VT, pp. 178-180, 1979. In FIG. 11, an antenna 20 is connected to a band pass filter 22 through a connection cable 24 and connectors 26.

In this case, since the band pass filter 22 is designed so as usually to pass a wave of only a transmission and receiving frequency band, when the antenna device using this conventional filter is used for receiving, the wave within the receiving frequency band received by the antenna 20 is passed through the band pass filter 22 to input to a receiver. However, an unwanted wave outside the receiving frequency band is stopped by the band pass filter 22 and can not be input to the receiver. On the other hand, when the antenna device using this conventional filter is used for transmitting, only the wave within the transmission frequency band is led from the antenna 20 and the unwanted wave outside the transmission frequency band is stopped by the band pass filter 22. Hence, only the wave within the transmission frequency band can be emitted from the antenna 20.

As described above, the antenna device using the filter 22, as shown in FIG. 11, has a function to receive or transmit only the wave within the necessary frequency band.

However, in the conventional antenna device having the structure described above, the connection cable 24 and the connectors 26 for connecting the antenna 20 with the band pass filter 22 are required. Thus, the device is enlarged and the loss is increased. Further, since the antenna 20 and the band pass filter 22 independently function or operate, it is necessary to provide a matching portion for performing the impedance matching of the antenna 20, and the antenna 20 is enlarged. Also, since the antenna 20 constitutes a one stage resonator, it is difficult to perform the impedance matching over a wide band.

In the conventional antenna device, when the inverted F antenna 17 is used as the antenna 20, these problems of the necessity of the matching portion provision and the difficulty of the wide band impedance matching become particularly troublesome.

DISCLOSURE OF INVENTION

The present invention is achieved in order to prevent the above-described problems of the prior art, and it is a first object of the present invention to provide an antenna device capable of readily performing a feeding to an inverted F antenna.

At the same time, it is a second object of the present invention to provide an antenna device capable of performing with a small size, a low loss and over a wide band, being particularly suitable for an inverted F antenna.

In order to solve the aforementioned problems, in an antenna device according to the present invention, an electrode for performing an electric field or magnetic field coupling is provided to a plate conductor, and by the electric field or magnetic field coupling of the electrode and the plate conductor, a non-contact feeding from a feeder line to an antenna can be performed.

Further, a resonant element is also provided, and by integrating the resonant element and the plate conductor to constitute a filter, an impedance matching of the antenna device can be carried out over a wide band.

In a more specific description of the structure of the present invention, in order to achieve the first object, the antenna device according to the present invention comprises a first conductor plate for forming a radiation conductor of an antenna; a second conductor plate arranged approximately in parallel with the first conductor plate for forming a ground conductor of the antenna; a conductor for connecting the first conductor plate with the second conductor plate at one end of the first conductor plate; a feeder line; and a third conductor plate for feeding, which is arranged between the first conductor plate and the second conductor plate and is connected to the feeder line to cause either an electric field or magnetic field coupling between the first conductor plate and the third conductor plate.

In the antenna device according to the present invention, as constructed described above, since between a first conductor plate for forming a radiation conductor of an antenna and a second conductor plate for forming a ground conductor of the antenna, a third conductor plate connected to a feeder line is inserted in a position for causing an electric field or magnetic field coupling between the first conductor plate and the third conductor plate, the electric field or magnetic field coupling is caused, and thus a non-contact feeding from the feeder line to the antenna can be carried out. Also, by varying the interval between the first conductor plate and the third conductor plate or the dimension of the third conductor plate, the coupling amount is controlled. Further, since an impedance matching of the feeder line and the antenna is obtained, the arrangement restriction of the first conductor plate and the feeder line can be relieved.

Further, in order to achieve the second object, an antenna device according to the present invention comprises an antenna constituted by a resonant element such as a dipole antenna, an inverted F antenna, a patch antenna or the like, a resonator and a coupling means for coupling the antenna with the resonator, the coupling means integrating the antenna and the resonator to perform an impedance matching, the resonant element and the resonator constituting a band pass filter.

In the antenna device according to the present invention, as constructed described above, since the resonant element of the antenna acts as the resonator of the last stage in the band pass filter, the housing of the resonators can be reduced by one stage, and the antenna device can be miniaturized with a low loss. Also, since the antenna and the resonators are integrated to perform the impedance matching, no individual matching portion is required to the antenna, and thus a small-sized antenna device can be obtained. Further, by integrating the antenna and the resonators, a multi-stage filter including the antenna can be obtained, and thus the impedance matching over the wide band can be carried out.

Best Mode for Carrying Out the Invention

Figure 1:
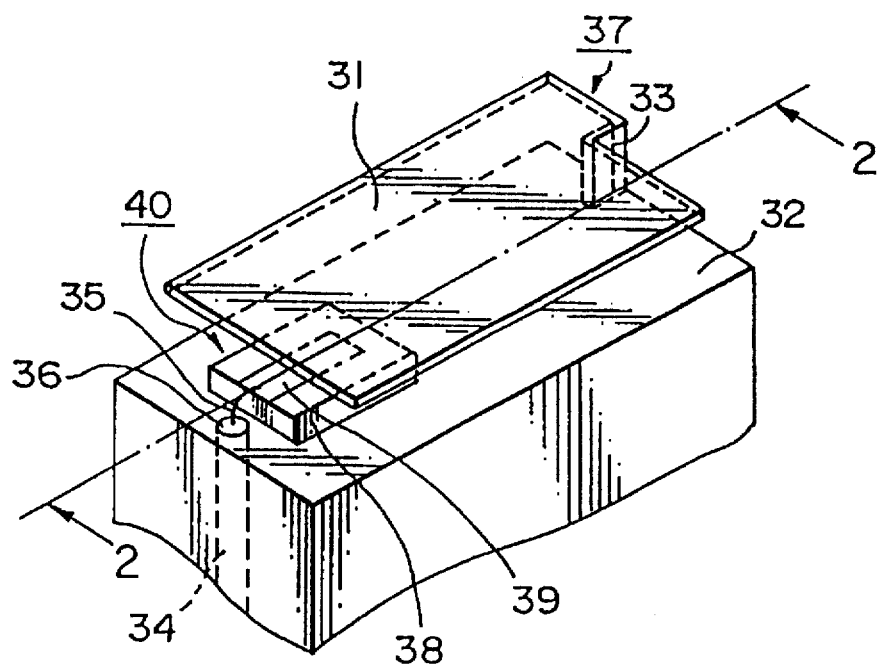
FIG. 1 is a perspective view of an essential part of a first embodiment of an antenna device according to the present invention.

FIG. 1 is a perspective view showing an essential part of one preferred embodiment of an antenna device according to the present invention. The one preferred embodiment of the antenna device according to the present invention is constructed as an inverted F antenna 37 provided with a feeding means.

In FIG. 1, the inverted F antenna 37 includes a plate conductor 31 with an approximately rectangular shape constituting a radiative conductor, and a ground conductor 32 constituted by metallic plates of a radio frame body. The plate conductor 31 is arranged approximately in parallel with the ground conductor 32, and one end in the longitudinal direction of the plate conductor 31 is connected to the ground conductor 32 by a grounding conductor 33. A coaxial line 34 as a feeder line for the inverted F antenna 37 is comprised of an internal conductor 35 and an external conductor 36.

In this embodiment, as a distinctive feature, a dielectric substrate 38 provided with a third conductor plate 39 therein is mounted on the ground conductor 32, and the third conductor plate 39 is connected with the internal conductor 35 of the coaxial line 34, as hereinafter described in detail. Hence, a non-contact feeding can be performed to the inverted F antenna 37 from the coaxial line 34 as the feeder line.

In FIG. 1, the third conductor plate is shown as a strip conductor 39 and is formed on the surface of the dielectric substrate 38. The strip conductor 39 as the third conductor plate is arranged facing the plate conductor 31 between the plate conductor 31 and the ground conductor 32. Further, in this embodiment, the ground conductor 32, the dielectric substrate 38 and the strip conductor 39 constitute a micro strip line 40. In this case, the strip conductor 39 is coupled with the internal conductor 35 at one end on an opening side of the plate conductor 31, and the other end is an open end.

Next, the operation of the antenna device described above will now be described.

In the above-described antenna device, in a similar manner to the conventional antenna device described previously, the inverted F antenna 37 acts as a resonator with one short-circuit end and the other open end at a particular frequency $f_o$ depending on the longitudinal length of the plate conductor 31.

Figure 2:
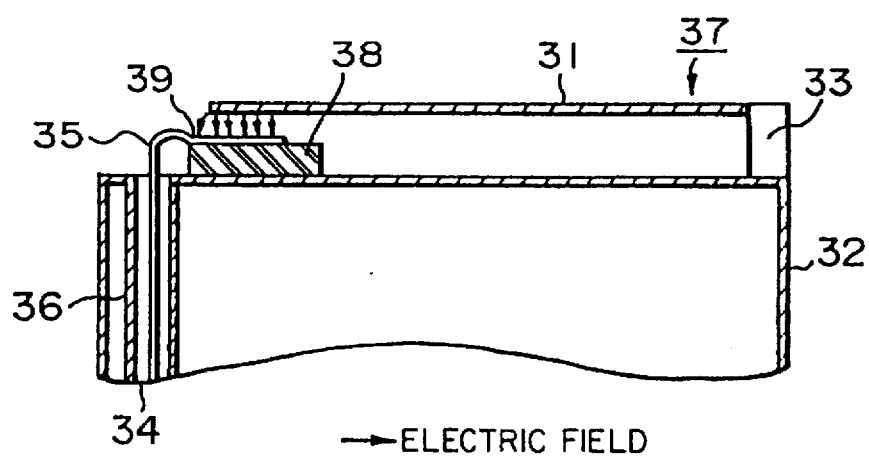
FIG. 2 is a cross section, taken along the line A—A of the antenna device shown in FIG. 1.

FIG. 2 is a cross section, taken along the line A—A shown in FIG. 1 for the explanation of the feeding in the above-described antenna device. In FIG. 2, the same numerals denote the same parts as those shown in FIG. 1.

In the drawings, when an electric wave having a frequency $f_o$ is transmitted to the micro strip line 40 from the coaxial line 34, an electric field as shown by arrows in FIG. 2 is caused between the plate conductor 31 and the strip conductor 39, and thus an electric field coupling between the micro strip line 40 and the inverted F antenna 37 is mainly carried out. Hence, a non-contact feeding of the wave of the frequency $f_o$ is performed to the inverted F antenna 37 from the coaxial line 34 by the electric field coupling. The fed wave of the frequency $f_o$ is resonated by the inverted F antenna 37 and is emitted externally from the same.

As described above, in the inverted F antenna 37 shown in FIG. 1, having a function of an antenna device, the impedance matching between the coaxial line 34 and the inverted F antenna 37 can be controlled by varying the position and the dimension of the strip conductor 39 with respect to the plate conductor 31 or the interval between the plate conductor 31 and the strip conductor 39.

Further, in this embodiment shown in FIG. 1, since the open ends of the plate conductor 31 and the strip conductor 39 face in mutually opposite directions and thus the current flows on the opposite surfaces of the plate conductor 31 and the strip conductor 39 are in opposite directions, a potential difference therebetween becomes large and a close coupling due to the electric field can be readily obtained. Also, even when the position of the micro strip line 40 is varied, by varying the size of the strip conductor 39 or the interval between the plate conductor 31 and the strip conductor 39, the impedance matching can be readily controlled.

Figure 3:
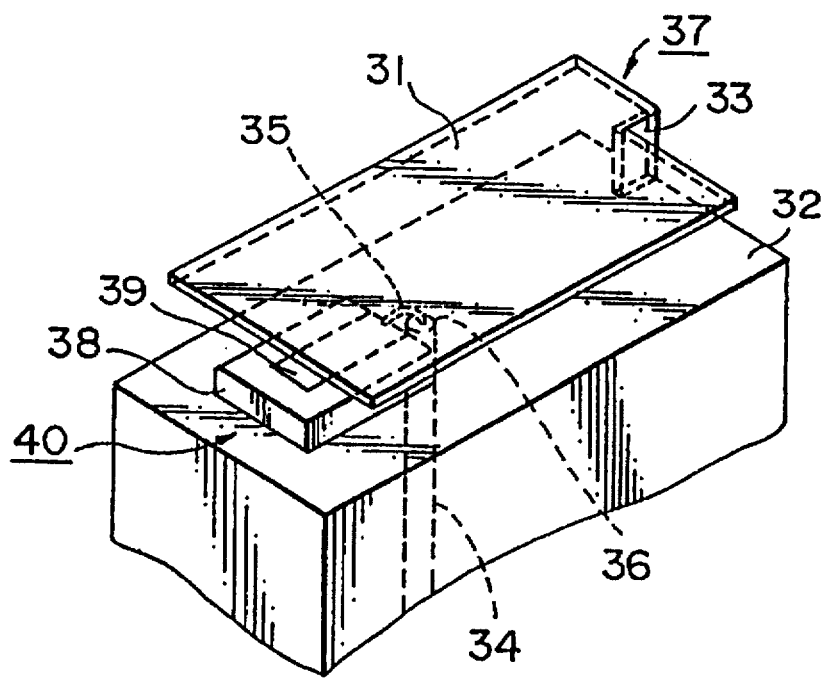
FIG. 3 is a perspective view of an essential part of a second embodiment of an antenna device according to the present invention.

FIG. 3 is a perspective view showing an essential part of the second embodiment of an antenna device according to the present invention. In FIG. 3, the same numerals denote the same parts as those of the first embodiment shown in FIG. 1 and thus the description thereof can be omitted for brevity.

In the second embodiment, as a distinctive feature, the open end of the strip conductor 39 is arranged on the opposite side to the first embodiment, that is, the open end of the strip conductor 39 is arranged on the opening side of the plate conductor 31. The other end of the strip conductor 39 is coupled with the internal conductor 35 of the coaxial line 34.

Next, the operation of the antenna device described above will now be described.

In this case, the basic operation of the above-described second embodiment is the same as the first embodiment shown in FIG. 1. That is, when the electric wave having the frequency $f_o$ is transmitted to the micro strip line 40 from the coaxial line 34, the electric field as shown by the arrows in FIG. 2 is caused between the plate conductor 31 and the strip conductor 39, and thus the electric field coupling between the micro strip line 40 and the inverted F antenna 37 is mainly carried out. Hence, the non-contact feeding of the wave of the frequency $f_o$ is performed to the inverted F antenna 37 from the coaxial line 34 by the electric field coupling. The fed wave of the frequency $f_o$ is resonated by the inverted F antenna 37 and is emitted externally from the same.

In the above-described embodiment, since the open ends of the plate conductor 31 and the strip conductor 39 face the same direction and thus the current flows on the opposite surfaces of the plate conductor 31 and the strip conductor 39 are in the same direction, the potential difference becomes small and a loose coupling due to the electric field can be readily obtained. In this case, since the current flow directions are the same, a magnetic field coupling becomes strong.

Figure 4:
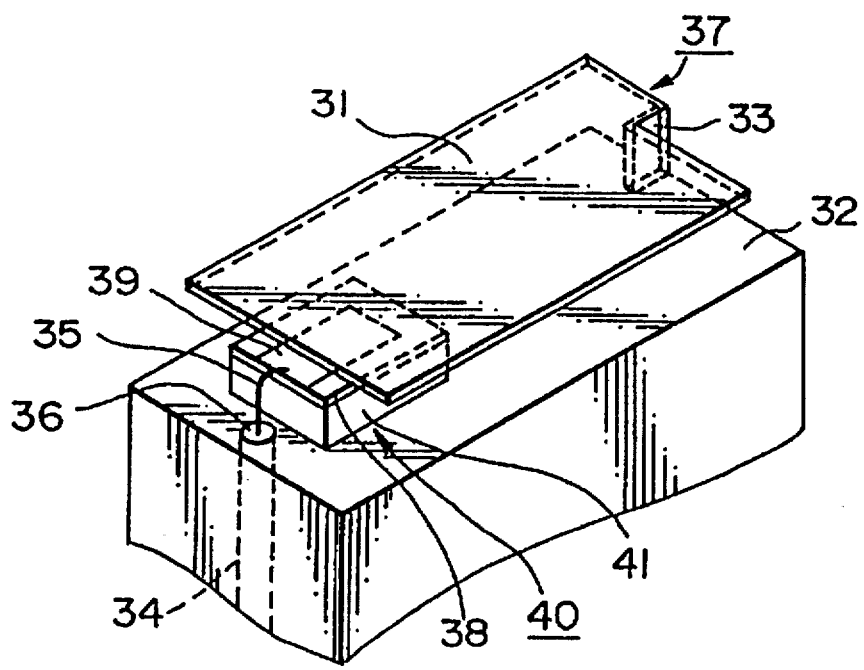
FIG. 4 is a perspective view of an essential part of a third embodiment of an antenna device according to the present invention.

FIG. 4 is a perspective view showing an essential part of the third embodiment of an antenna device according to the present invention. In FIG. 4, the same numerals denote the same parts as those of the first embodiment shown in FIG. 1 and thus the description thereof can be omitted for brevity.

In the third embodiment, as a distinctive feature, a conductor block 41 is provided. That is, the conductor block 41 is inserted between the plate conductor 31 and the ground conductor 32 and is contacted with the ground conductor 32 at one surface and with the dielectric substrate 38 at the other surface. Hence, the dielectric substrate 38 is mounted on the conductor block 41, and the strip conductor 39 facing the plate conductor 31 is attached onto the dielectric substrate 38.

In the third embodiment, by properly determining the thickness of the conductor block 41, the interval between the plate conductor 31 and the conductor block 41 can be narrowed compared with the interval between the plate conductor 31 and the ground conductor 32. Also, since an electrostatic capacity is caused between the plate conductor 31 and the conductor block 41, a resonance frequency can be controlled by this electrostatic capacity and the plate conductor 31 can be effectively miniaturized. Further, by varying the area of the conductor block 41, the electrostatic capacity between the plate conductor 31 and the conductor block 41 can also be changed.

Further, in the above-described third embodiment, the feeding operation described in the first and second embodiments can be applied, and thus, by similarly operating, the same effect can be obtained.

Figure 5:
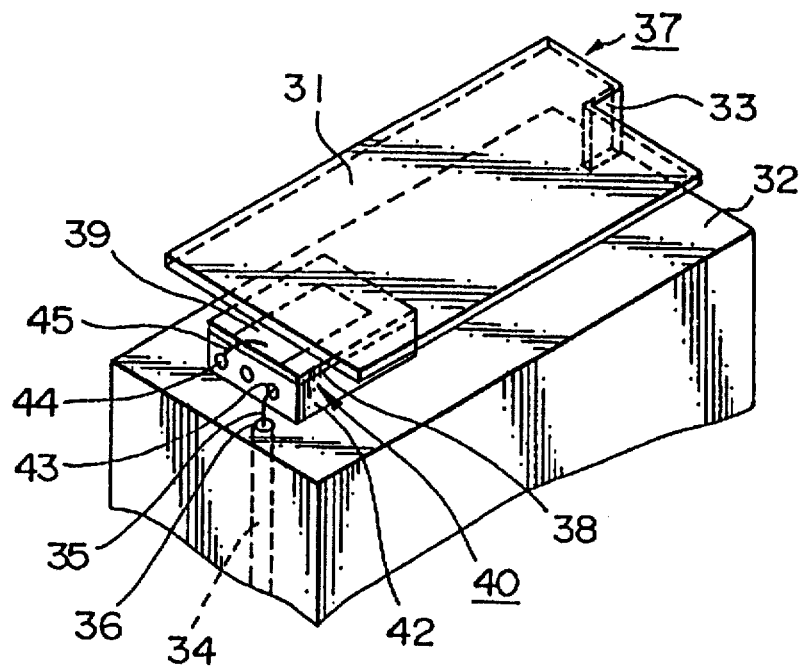
FIG. 5 is a perspective view of an essential part of a fourth embodiment of an antenna device according to the present invention.

FIG. 5 is a perspective view showing an essential part of the fourth embodiment of an antenna device according to the present invention. In FIG. 5, the same numerals denote the same parts as those of the first embodiment shown in FIG. 1 and thus the description thereof can be omitted for brevity.

In the fourth embodiment, as a distinctive feature, a filter 42 is used in place of the conductor block 41 in the third embodiment.

In this case, the filter 42 includes an input terminal 43 and an output terminal 44, and a connection conductor 45 couples the output terminal 44 with the strip conductor 39.

In this embodiment, the filter 42 has an external shape of an approximately rectangle, and almost all surroundings of the filter 42 except a small part are covered by a conductor. The input terminal 43 and the coaxial line 34 are connected to each other by the internal conductor 35. The output terminal 44 and the strip conductor 39 are coupled with each other by the connection conductor 45. Although the example of the filter 42 having the external form of the approximately rectangle has been shown, this is for handling convenience and thus this embodiment is not restricted to this form.

In this embodiment, since the electrostatic capacity is caused between the plate conductor 31 and the filter 42 in the same manner as the embodiment shown in FIG. 4, a resonance frequency can be controlled by the electrostatic capacity and the plate conductor 31 can be effectively miniaturized. Further, the filter 42 is inserted between the plate conductor 31 and the ground conductor 32, and hence the antenna device can be miniaturized.

Further, in the above-described fourth embodiment, the feeding shown in the first and second embodiments can be applied, and thus, by similarly operating, the same effect can be obtained.

Figure 6:
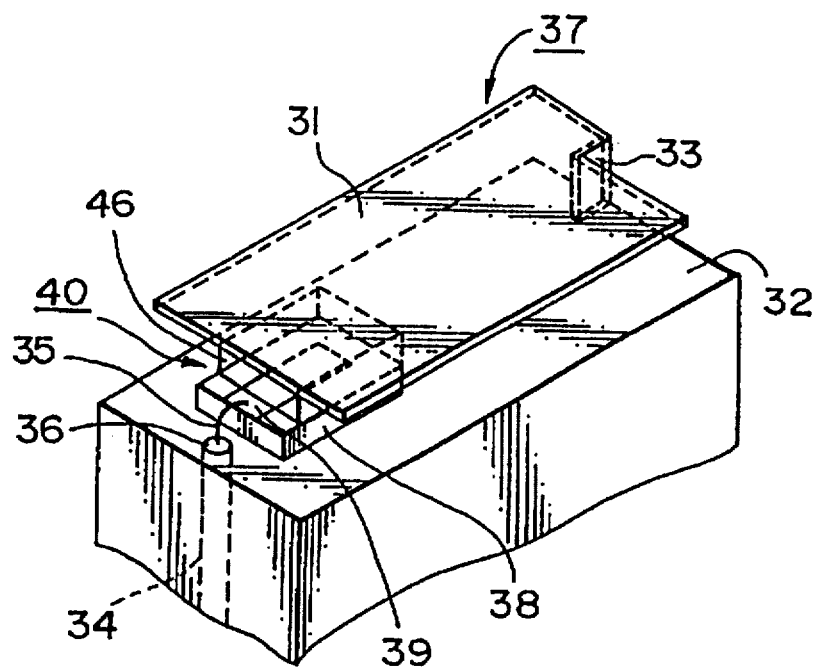
FIG. 6 is a perspective view of an essential part of a fifth embodiment of an antenna device according to the present invention.

FIG. 6 is a perspective view showing an essential part of the fifth embodiment of an antenna device according to the present invention. In FIG. 6, the same numerals denote the same parts as those of the first embodiment shown in FIG. 1 and thus the description thereof can be omitted for brevity.

In the fifth embodiment, as a distinctive feature, a spacer 46 composed of a dielectric substance is inserted between the plate conductor 31 and the strip conductor 39.

In the fifth embodiment, by using the spacer 46, the interval between the plate conductor 31 and the strip conductor 39 can be accurately determined, and the plate conductor 31 can be stably supported. Further, by changing the dielectric constant of the dielectric substance used, a coupling amount by the feeding can be controlled.

Further, in the above-described fifth embodiment, the feeding shown in the first and third embodiments can be applied, and thus, by similarly operating, the same effect can be obtained.

In the fifth embodiment, although the examples of the plate conductor 31 having the approximately rectangular form and the strip conductor 39 having the approximately rectangular form as the third conductor plate are shown, these are illustrative only and hence this embodiment is not restricted to the form shown in FIG. 6.

Further, in the drawing of the fifth embodiment, although the case that the longitudinal direction of the strip conductor 39 is coincident with the longitudinal direction of the plate conductor 31 is exemplified, another arrangement relationship of the strip conductor 39 with respect to the plate conductor 31 other than the above-described can be applied, and, when the arrangement relationship between these members is changed, it is considered that the contribution way of the electric field coupling and the magnetic field coupling can be changed. However, it is considered that in case of the feeding on the open end side of the plate conductor 31, the more effective feeding can be performed.

As specifically described in the first to the fifth embodiments, in the antenna device according to the present invention, the non-contact feeding can be carried out to the antenna from the feeding line. Further, by controlling the coupling amount of the electric field or magnetic field coupling, the impedance matching between the feeding line and the antenna can be obtained, and hence an antenna device with an easy feeding can be obtained.

On the other hand, in a usual antenna device, in order to receive or transmit only an electric wave of a necessary frequency band, a band pass filter for passing only a wave of a transmission and receiving frequency band is provided. That is, by passing only the wave of the transmission and receiving frequency band, a wave of an unwanted frequency band can be stopped by the band pass filter. Hence, an unwanted wave outside the receiving frequency band can not enter into a receiver, and only the wave of the transmission frequency band can be emitted from the antenna.

An antenna device according to the present invention also requires a band pass filter. However, in the antenna device according to the present invention, since the non-contact feeding from the feeding line to the antenna is carried out, the effects such as an easy feeding and an easy impedance matching between the feeding line and the antenna can be obtained, and it is necessary to provide the band pass filter without nullifying these beneficial effects.

However, in order to prevent the nullifying of the effects obtained in the antenna device according to the present invention, it is insufficient to use a filter of a conventional antenna device requiring a connection cable and connectors.

In an antenna device according to the present invention, a particular filter is used, as hereinafter described. One embodiment of an antenna device using a suitable filter according to the present invention will now be described in connection with the drawings.

Figure 7:
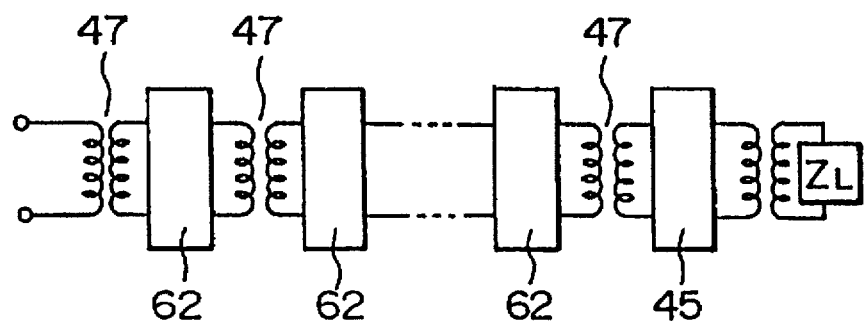
FIG. 7 is a block diagram showing a structure of a filter for use in an antenna device according to the present invention.

FIG. 7 is a block diagram showing a structure of an antenna device according to the present invention, and this antenna device is provided with a proper filter for the embodiments.

As shown in FIG. 7, an antenna 45 and resonators 62 are mutually connected by coupling means 47 and are integrated thereby. In FIG. 7, $Z_L$ represents a radiation impedance.

Figure 8:
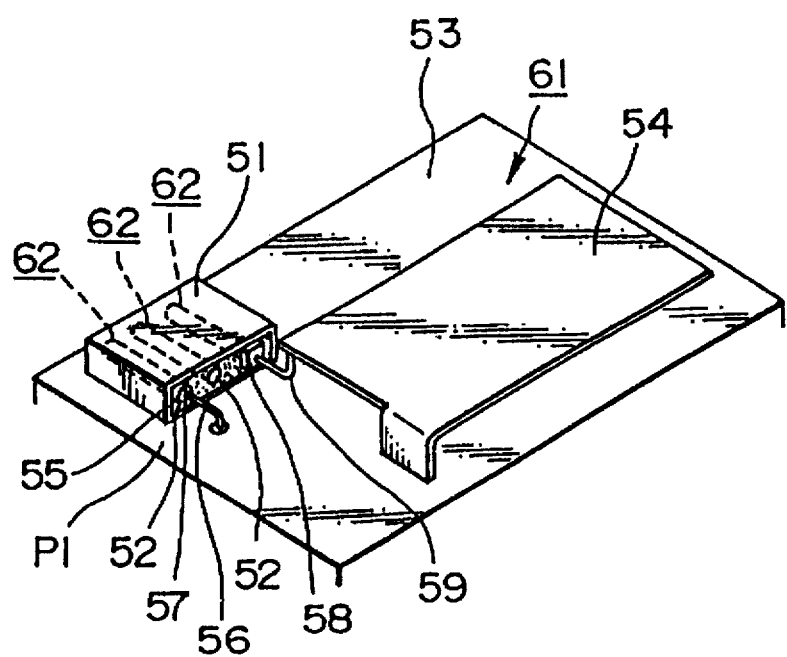
FIG. 8 is a perspective view of an essential part of a sixth embodiment of an antenna device according to the present invention.

FIG. 8 is a constructive view showing a structure of the sixth embodiment of an antenna device according to the present invention.

In the sixth embodiment, as a distinctive feature, a resonant element 54 of an inverted F antenna 61 and resonators 62 constitute a band pass filter. Also, the resonant element 54 and the resonators 62 constituting the distinctive band pass filter in the sixth embodiment are connected to each other by the coupling means 47.

The resonators 62 are comprised of an external conductor 51, internal conductors 52 and a dielectric block 55. The internal conductors 52 are arranged in parallel within the dielectric block 55. One set of ends of the internal conductors 52 on the same side are short-circuit ends, and the other ends of the same are open ends. The external conductor 51 covers all surfaces or sides of the dielectric block 55 except one side of the open ends of the internal conductors 52, and one wide width surface is tightly contacted with a earth plate 53.

Each coupling means 47, between the adjacent two of the resonators 62, is performed by the electro-magnetic coupling. And the coupling means 47, between the resonant element 54 and the resonator 62 located at one end, is composed of a capacitor 58 and a coupling conductor. One electrode of the capacitor 58 is connected to the internal conductor 52 at one end of the resonator 62, and the other electrode of the capacitor 58 is coupled with the resonant element 54 of the inverted F antenna 61 via the coupling conductor 59. In this case, P1 represents a terminal.

Further, in FIG. 8, since the earth plate 53 and the resonant element 54 of the inverted F antenna 61 are the same components as the ground conductor 32 and the plate conductor 31 of the inverted F antenna shown in the first to fifth embodiments described above, it is apparent for those skilled in the art that the filter shown in this embodiment can be applied to the inverted F antenna specifically shown in the first to fifth embodiments.

Now, by considering the above-description, the operation of the sixth embodiment of the antenna device described above will be described.

The resonant element 54 (the plate conductor 31) acts as a ¼ wavelength resonant element with one short-circuit end and the other open end at a particular frequency. In this case, the coupling amount of the resonators 62 and the inverted F antenna 61 can be controlled by the electrostatic capacity of the capacitors 58.

Now, assuming that the resonant element 54 (the plate conductor 31) of the inverted F antenna 61 and the resonators 62 resonate at the same frequency $f_o$, the mutual coupling amounts between the adjacent two of the resonators 62 and between the resonant element 54 (the plate conductor 31) and the resonator 62 are controlled so that the resonant element 54 (the plate conductor 31) and the three resonators 62 may constitute the band pass filter. At this time, the received wave near the frequency $f_o$ incident to the inverted F antenna 61 passes through the resonators 62 to be led to the receiver. On the other hand, another wave of a frequency different from the frequency $f_o$, i.e. outside the pass band of the band pass filter, is stopped even when it is received by the inverted F antenna 61, and can not come into the receiver. Further, relating to the transmission wave, by the same operating principle as the receiving operation, only the transmission wave near the frequency $f_o$ can be emitted from the inverted F antenna 61.

As described above, in the antenna device shown in FIG. 8, the filter possesses the function for receiving or transmitting only the wave of the necessary frequency band.

At this time, since the inverted F antenna 61 and the resonators 62 constitute a four stage band pass filter, the impedance matching in the wide band can be performed, and thus no individual matching portion is required to the inverted F antenna 61. Also, since the inverted F antenna 61 also serves as the resonator of the band pass filter, the number of the resonators 62 can be reduced by one stage compared with the conventional filter. Further, since the whole including the antenna constitute the multi-stage filter, a good impedance characteristic over a wide band can be obtained.

Figure 9:
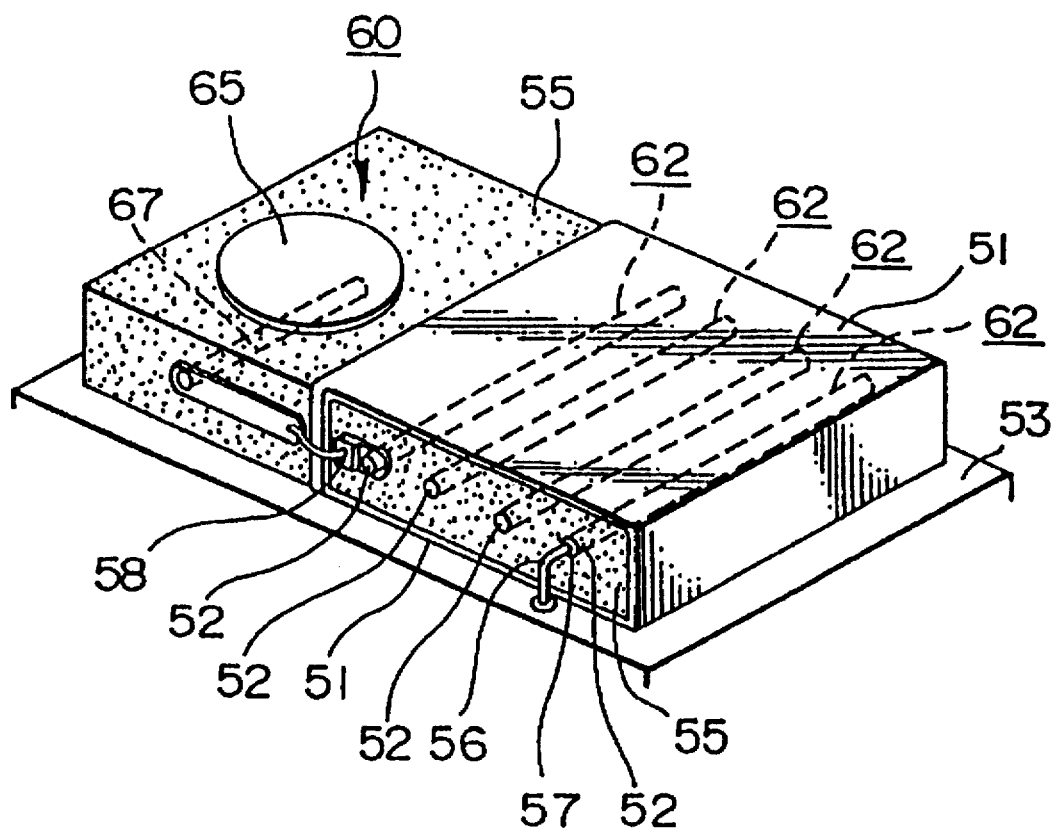
FIG. 9 is a perspective view of an essential part of a seventh embodiment of an antenna device according to the present invention.
Figure 10:
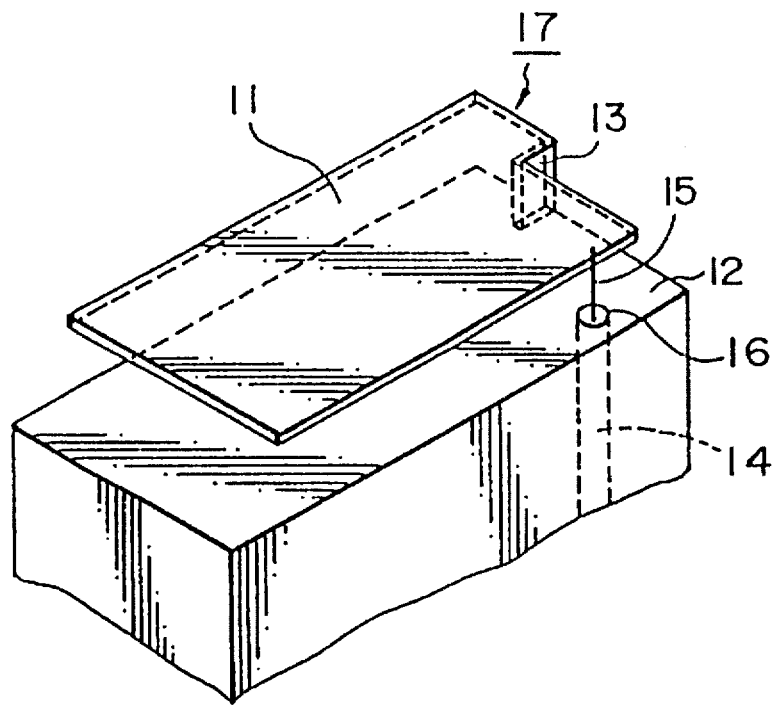
FIG. 10 is a schematic perspective view of a conventional antenna device.
Figure 11:
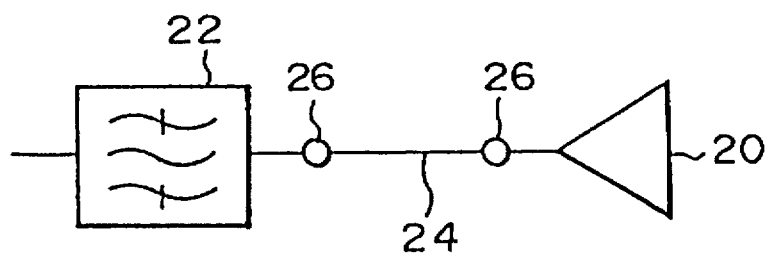
FIG. 11 is a block diagram showing a structure of a filter for use in a conventional antenna device.

FIG. 9 is a constructive view showing the seventh embodiment of an antenna device according to the present invention. In FIG. 9, the same numerals denote the same parts as those of the embodiment shown in FIG. 8 and thus the description thereof can be omitted for brevity.

In this embodiment, as a distinctive feature, a circular resonator 65 is used and is adapted to perform a electromagnetic coupling with a coupling element 67. A circular patch antenna 60 is constituted by an external conductor 51, a dielectric block 55 and the circular resonator 65. In this case, the circular resonator 65 acts as a ½ wavelength resonant element at a particular frequency. The embodiment shown in FIG. 9 has the same operating principle and functions as the first embodiment. Also, since the circular patch antenna 60 and the resonators 62 can be integrally constructed by the dielectric block 55, the fabrication of this antenna device can be readily carried out and the miniaturization of the same can also be made possible.

In the aforementioned embodiments, although three or four resonators 62 are used, one to two or more than five resonators 62 can be applied, and the same operating principle and the effects as those of the above-described embodiments can be obtained.

Further, in the above-described embodiments, although the inverted F antenna or the patch antenna is used, a dipole antenna can be also used.

Industrial Applicability

As described above, in an antenna device according to the present invention, between a first conductor plate for forming a radiation conductor of an antenna and a second conductor plate for forming a ground conductor of the antenna, a third conductor plate connected to a feeder line to cause an electric field or magnetic field coupling between the first conductor plate and the third conductor plate is arranged, and thus a non-contact feeding from the feeder line to the antenna can be carried out by the electric field or magnetic field coupling. By varying the interval between the first conductor plate and the third conductor plate or the dimension of the third conductor plate, the coupling amount is controlled, and thus an impedance matching of the feeder line and the antenna is obtained. Hence, the arrangement restriction of the first conductor plate and the feeder line can be relieved, and the antenna device capable of readily carrying out the feeding can be obtained.

Further, in a filter of an antenna device according to the present invention, an antenna constituted by a resonant element such as a dipole antenna, an inverted F antenna, a patch antenna or the like and resonators are integrated by a coupling means to perform an impedance matching, and the resonant element and the resonators constitute a band pass filter. Hence, the number of resonators constituting the band pass filter can be reduced by one stage, and a filter-antenna device can be miniaturized with a low loss. Also, no individual matching portion is required for the antenna, and a small-sized filter-antenna device can be obtained. Further, by including the antenna, a multi filter can be obtained, and thus a filter-antenna which operates over a wide band can be obtained.

Accordingly, when such a filter is used for an antenna device, the antenna device capable of performing the impedance matching over the wide band can be obtained.

What is claimed is:

1. A filter antenna device, comprising:
   a resonant antenna element;
   a resonator including a plurality of resonant elements, disposed in parallel and enclosed within a metal conductor;
   coupling means for coupling the antenna element to an output of the resonator, said coupling means performed by an electromagnetic coupling, wherein through said coupling, the resonator and antenna element in combination perform an impedance matching between an input of the resonator, which is coupled to a feeding line, and the antenna element; and
   the antenna element and the resonator thereby comprising a band pass filter, wherein said antenna element acts as the resonant element of a last stage in said band pass filter.

2. An antenna device, comprising:
   a first conductive element;
   a second conductive element disposed below and substantially in parallel with the first conductive element; and
   N−1 resonators, wherein N is an integer greater than 1, disposed in parallel, between the first conductive element and the second conductive element whereby the N−1 resonators and the first conductive element combine to form an N-stage band pass filter, wherein said first conductive element acts as a last stage in said N-stage band pass filter.

3. The antenna device as claimed in claim 2, wherein the first conductive element operates at a quarter wavelength of a resonate frequency of the antenna.

4. The antenna device as claimed in claim 2, wherein the first conductive element is a circular resonator which operates at a half wavelength of a resonate frequency of the antenna.

5. The antenna device as claimed in claim 2, further comprising a capacitive element disposed between the first conductive element and one of the plurality of resonators.

6. The antenna device as claimed in claim 2, wherein one end of the plurality of resonators are short circuited together and an opposite end of at least one of a plurality of resonators is an open circuit.

7. The antenna device as claimed in claim 2, wherein the first conductive element comprises any one of a dipole antenna, an inverted F antenna, and a patch antenna.

8. The antenna device as claimed in claim 2, wherein the resonators are coupled together by means of electromagnetic coupling.

* * * * *